United States Patent
De Block

(10) Patent No.: US 6,675,432 B1
(45) Date of Patent: Jan. 13, 2004

(54) DEVICE FOR HINGEABLY JOINING A MOTOR VEHICLE WINDOW-PANE WIPER BLADE TO A WIPER ARM

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,092

(22) PCT Filed: Oct. 23, 1999

(86) PCT No.: PCT/DE99/03401

§ 371 (c)(1),
(2), (4) Date: Nov. 13, 2000

(87) PCT Pub. No.: WO00/48877

PCT Pub. Date: Aug. 24, 2000

(30) Foreign Application Priority Data

Feb. 15, 1999 (DE) ......................................... 199 06 288

(51) Int. Cl.⁷ .................................................. B60S 1/40
(52) U.S. Cl. .................................. 15/250.32; 15/250.451
(58) Field of Search ........................... 15/250.32, 250.43, 15/250.451, 250.44

(56) References Cited

U.S. PATENT DOCUMENTS

| | | | | |
|---|---|---|---|---|
| 2,782,448 A | * | 2/1957 | Anderson ................ | 15/250.32 |
| 3,006,018 A | * | 10/1961 | Golub et al. ............. | 15/250.43 |
| 6,000,093 A | * | 12/1999 | Charng ................... | 15/250.201 |
| 6,279,191 B1 | * | 8/2001 | Kotlarski et al. ....... | 15/250.451 |
| 6,308,373 B1 | * | 10/2001 | Merkel et al. ........... | 15/250.43 |

FOREIGN PATENT DOCUMENTS

| | | |
|---|---|---|
| DE | 24 58 292 | 6/1976 |
| DE | 196 27 115 A | 1/1998 |
| DE | 198 16 409 A | 10/1998 |
| DE | 197 29 864 A | 1/1999 |
| WO | WO-99/02383 | * 1/1999 |

* cited by examiner

*Primary Examiner*—Theresa T. Snider
(74) *Attorney, Agent, or Firm*—Michael J. Striker

(57) ABSTRACT

A device is proposed, which is for pivotally connecting a wiper blade (10) for motor vehicle windows to a wiper arm (12) that is guided on the motor vehicle and can be moved back and forth between reversing positions. On its free end section, the wiper arm (12) is provided with a pivot bolt (16) extending essentially in the movement direction (double arrow 18) for connecting the wiper blade, which can be placed with an elongated, rubber elastic wiper strip (20) against the window (24), wherein the elongated wiper blade (10) has a pivot bolt bearing (48) and a structure for securing the wiper blade to the pivot bolt (16) guided in the bearing. A particularly operationally reliable and easy-to-assemble connecting device is produced if the wiper strip assemble connecting device is produced if the wiper strip (20) of the wiper blade (10) is secured to a spring elastic, (20) of the wiper blade (10) is secured to a spring elastic, band-like, elongated support element (28), which on its two band-like, elongated support element (28), which on its two longitudinal sides, at least in sections, protrudes beyond the longitudinal sides of the wiper strip (20) with edge strips (30), wherein a coupling element (38) with the pivot bolt bearing (48) is disposed on the upper band surface of the support element (28) remote from the window and the coupling is connected to the edge strips (30) to the support element via securing means (50).

11 Claims, 3 Drawing Sheets

Figure 1:
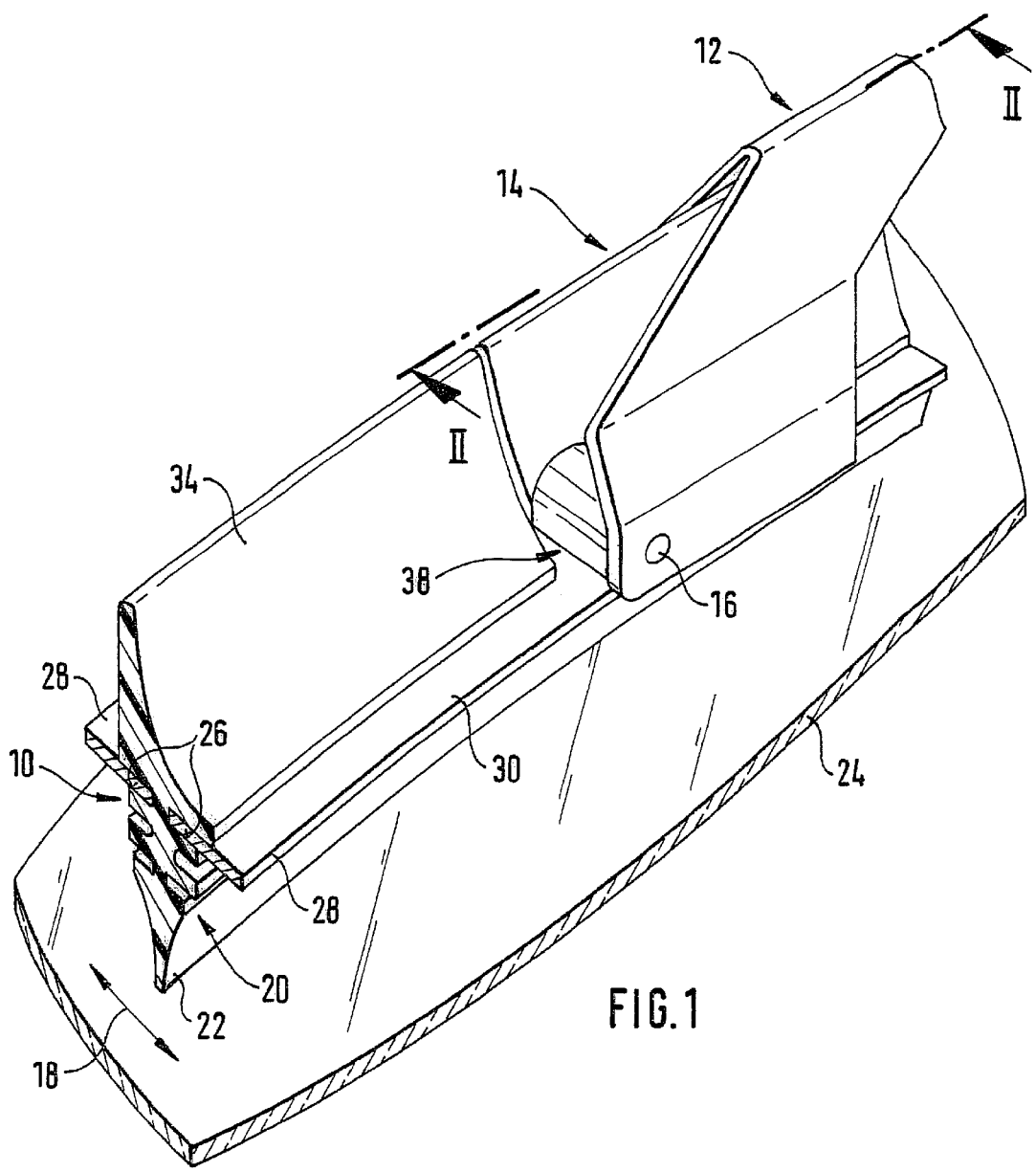

DEVICE FOR HINGEABLY JOINING A MOTOR VEHICLE WINDOW-PANE WIPER BLADE TO A WIPER ARM

BACKGROUND OF THE INVENTION

The invention is based on a device for pivotally connecting a wiper blade to a wiper. In a known device of this type (DE 24 58 29 2 A)—which has also clearly been previously used—the pivot bolt protrudes laterally from the wiper arm. The pivot bolt bearing toward the wiper blade side is a plug receptacle for the pivot bolt and the pivot bolt is inserted into it. In order to secure the operating position between the wiper blade and wiper arm, the pivot bolt is provided with a continuous detent groove disposed on its outer circumference in which a detent spring engages in detent fashion. There are no further indications as to the disposition and embodiment of the connecting device. In the device that has clearly been previously used, the pivot bolt bearing is constituted by a lateral bore in the main bracket of a support bracket frame, which grasps the wiper strip, is made up of a number of parts, and thus has a high structural height. A device of this kind, however, is not possible when the wiper strip is intended to be held by a support element as has been disclosed, for example, in DE 196 27 115 A1 and which decisively contributes to a low structural height of the wiper blade.

SUMMARY OF THE INVENTION

In the connecting device according to the invention, it is possible to utilize the advantages of the low structural height of the wiper blade made possible by the band-like support element even if the pivot bold of the connecting device is disposed on the wiper arm. The edge strips of the support element permit an operationally reliable attachment of the coupling element to the upper band surface of the support element remote from the window.

In order to achieve a simple, long-lasting connection between the wiper strip and support element, in an improvement of the concept of the invention, the support element has two support strips which are disposed in longitudinal grooves of the wiper strip and at least over a longitudinal section, protrude from their longitudinal grooves with edge strips that are engaged by the securing means of the coupling element.

A simple mounting of the pivot bolt disposed on the wiper arm in its pivot bolt bearing situated toward the wiper blade side is achieved if the coupling element is divided in a plane disposed at least approximately parallel to the window, if the dividing plane intersects the pivot bolt bearing, and if in addition, the two coupling element halves are detachably connected to each other.

For the sake of further simplifying assembly, the pivot bolt bearing, in the longitudinal direction of the wiper blade, is disposed in an end section of the coupling element and the two coupling element halves are connected to one another and of one piece with one another by means of a film hinge in the vicinity of the pivot bolt bearing. As a result, the two complementary coupling element halves are already in a proper mounting position so that after the insertion of the wiper arm pivot bolt into the one half, the other half merely needs to be folded onto the other half.

A simple and operationally reliable connection of the coupling element to the wiper blade is achieved by virtue of the fact that with regard to the position of the dividing plane in relation to the window, the lower half of the coupling element encompasses the longitudinal outer edges of the edge strips of the support element with securing claws that constitute securing means.

If in addition, two securing claws disposed spaced apart from each other engage each edge strip of the support element, a stable connection is produced between the support element and the coupling element which withstands even the high long-term strain occurring there.

If, with regard to the position of the dividing plane in relation to the window, the upper half of the coupling element is provided with elastically deflectable detent hooks which traverse the longitudinal outer edges of the edge strips and cooperate in detent fashion with the lower band surface of the support element, the upper half of the coupling element is simply secured in its closed position in which the pivot bolt is completely enclosed.

So that a slim construction of the coupling element can be achieved, the detent hooks of the upper half of the coupling element are disposed between the securing hooks of the lower half. The detent hooks therefore do not have to overlap the securing hooks.

In another embodiment of the invention, at least in the vicinity of the pivot bolt, the wiper arm has two walls spaced apart from and parallel to each other, which are aligned protruding toward the window, each of which secures an end of the pivot bolt, and the distance between the walls is matched to the width of the coupling element. This produces a favorable, low-play guidance of the wiper blade between the walls of the wiper arm, which is an important requirement for the desired smooth wiper operation.

If the wiper blade has with a wind deflecting strip that extends beyond the upper band surface of the support element, in a modification of the concept of the invention, the coupling element is disposed in a recess in the wind deflecting strip and the upper half of the coupling element is provided with an extension whose cross section at least approximates the cross section of the wind deflecting strip. As a result, the wind deflecting strip is also optically extended in the vicinity of the connecting device and promptly achieves the effect expected from the wind deflecting strip with regard to the distribution of the wiper blade pressure at higher driving speeds, even in the center region of the wiper blade, i.e. in the vicinity of the recess. Therefore the recess does not have a negative impact on the pressure distribution of the wiper strip on the window to be wiped.

Suitably for the realization of its various functions, the coupling element is made of an elastic plastic.

Other advantageous updates and improvements of the invention are disclosed in the following description of an exemplary embodiment shown in the accompanying drawings.

BRIEF DESCRIPTIONS OF THE DRAWINGS

Figure 2:
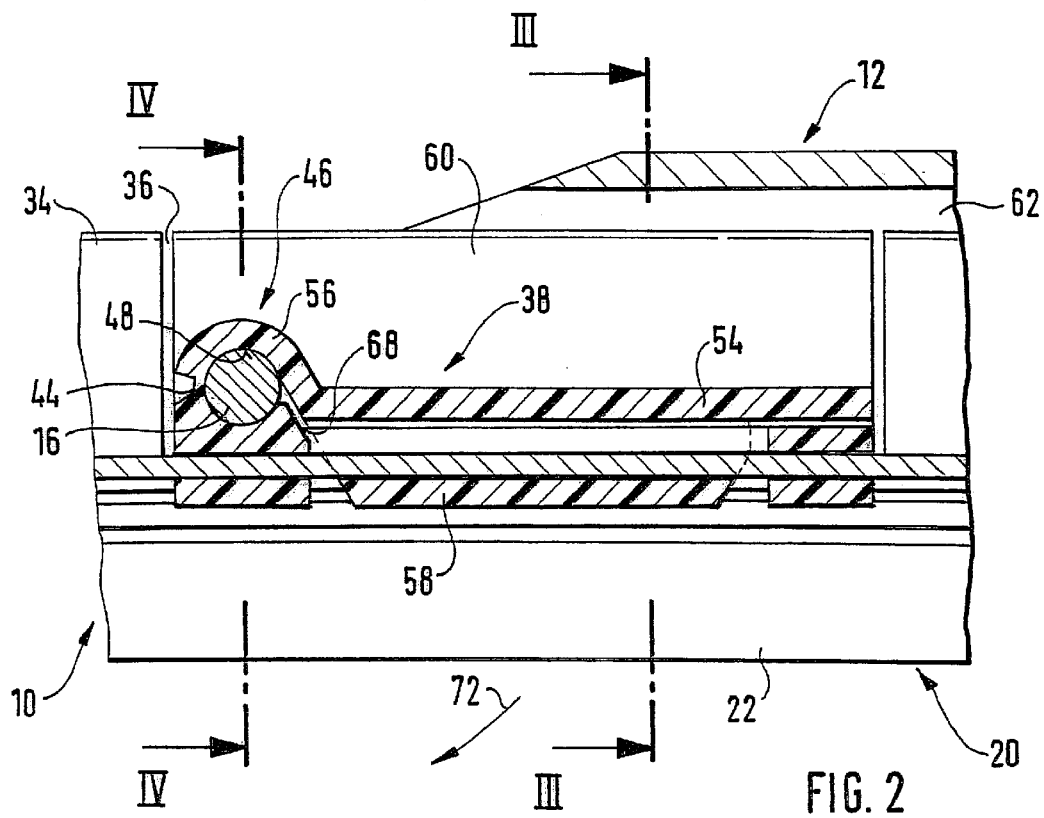
Figure 3:
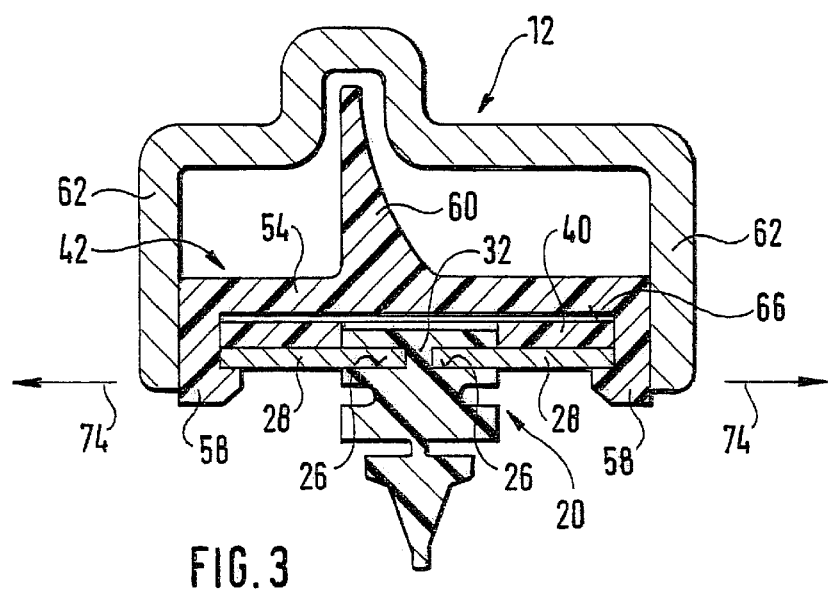
Figure 4:
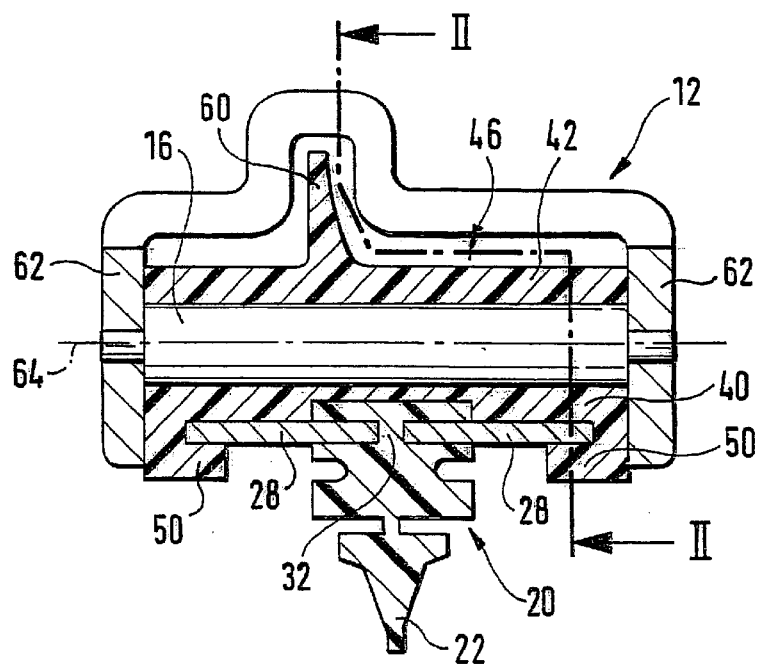
Figure 5:
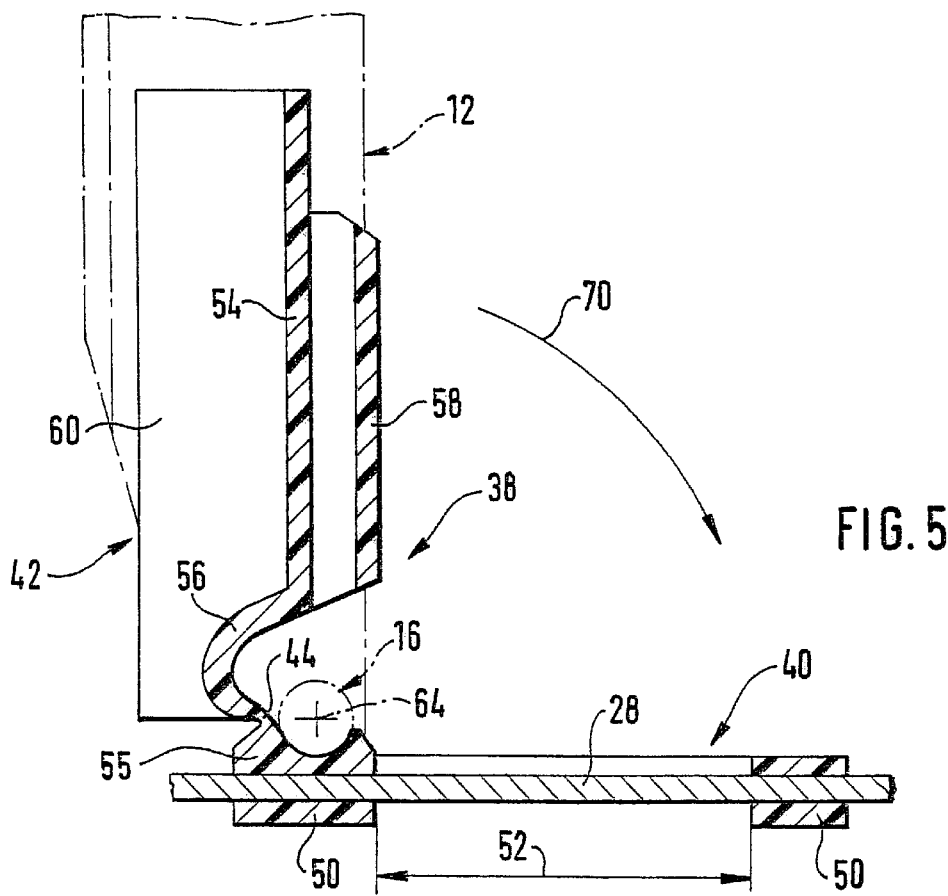

FIG. 1 is a perspective partial view of a wiper arm and a wiper blade with a device for pivotally connecting these two components, FIG. 2 is a longitudinal section along the line II—II through the device according to FIG. 1, depicted in a rotated and enlarged fashion, where the course of intersection follows the line II—II in FIG. 4, FIG. 3 shows the sectional area of a section through the device according to FIG. 2, along the line III—III, FIG. 4 shows the sectional area of a section through the device according to FIG. 2, along the line IV—IV, and FIG. 5 shows the device according to FIG. 2, wherein the coupling element is shown in a preassembly position and the wiper arm to be mounted is depicted with dot-and-dash lines.

DESCRIPTION OF THE PREFERRED EMBODIMENT

A wiper blade 10 for cleaning vehicle windows, a detail of which is shown in FIG. 1, is pivotally connected in its center section tot he free end of a driven wiper arm 12 that is guided on the motor vehicle. This connection takes place with the aid of a connecting device 14, which includes a pivot bolt 16 extends essentially in the movement direction (double arrow 18 in FIG. 1) of the elongated wiper blade 10, which is moved lateral to its longitudinal span over the window by the wiper arm 12. The wiper blade 10 has an elongated, rubber elastic wiper strip 20, which is placed with a wiper lip 22 against the surface of the vehicle window 24 to be wiped. The wiper strip 20 is provided on its longitudinal sides with longitudinal grooves 26 that are open at the edges, each of which accommodates a spring strip 28 made of a spring elastic material. The two spring strips 28 are disposed in a common plane which is situated spaced apart from the front of the surface of the window 24 to be wiped. The two spring strips 28 are part of a support element for securing the wiper strip 20. They extend over the entire length of the wiper strip 20 and in the center region of the wiper strip, protrude from their longitudinal grooves 26 with edge strips 30. In order to secure the spring strips 28 in the longitudinal grooves 26 lateral to their longitudinal span, the spring strips can be clasped by securing clamps also included with the support element. With a longitudinal rib 32 (FIGS. 3 and 4), the wiper strip 20 extend between the spring strips 28 and is embodied as a wind deflecting strip 34 on the side of the spring strips 28 remote from the window 24. As shown particularly in FIG. 1, the wind deflecting strip 34 center section of the wiper blade is provided with a recess 36 which is used to contain a coupling element 38. The coupling element 38 serves to connect the wiper blade 10 to the wiper arm 12 and consequently is part of the connecting device 14 as is the pivot bolt 16 of the wiper arm. As shown particularly in FIG. 5, the coupling element 38 is essentially embodied of two parts. It has a lower half 40 which is connected to the spring strips 28 of the support element. In addition, the coupling element 38 has an upper half 42, which is connected to the low half 40 and is of one piece with it by means of a film hinge 44. As shown particularly in FIGS. 2 and 4, the two sections of the lower half 40 and the upper half 42 of the coupling element 38 adjoining the film hinge 44 are embodied as a bearing hub 46, which is provided with a bearing bore 48, which is used to contain the pivot bolt 16. The lower half 40 of the coupling element encompasses the edge strips 30 of the spring strips 28 with securing claws 50 that constitute securing means. These securing claws are disposed across from each other in pairs (FIG. 4) and are spaced apart from each other by a distance 52 in the longitudinal direction of the wiper blade 10. On the one hand, the securing claws 50 secure the coupling element 38 to the support element and on the other hand, they secure the two spring strips 28 of the support element in the longitudinal grooves 26 of the wiper strip 20. Furthermore, a longitudinal locking of the coupling element 38 to the support element can be produced by the walls of the recess 36 that face one another, because the wiper strip 20 itself is affixed to the support element. Moreover, the lower half 40 of the coupling element 38, on its end that has the film hinge 44, is provided with one bearing hub half 55. The upper half 42 of the coupling element 38 has a plate-like base body 54 whose end that has the film hinge 44 also has the other bearing hub half 56 disposed on it. FIG. 2 shows the coupling element 38 in the operating position in which the pivot bolt 16 is disposed in the bearing bore 48. As shown particularly in FIG. 3, elastically deflectable detent hooks 58 disposed on the base body of the upper half 42 engage underneath the edge strips 30 of the spring strips 28. The detent hooks 58, which constitute securing means, are disposed between the securing claws 50 of the lower half 40 of the coupling element 38. They traverse the plane of the spring strips 28 in the free space constituted by the distance 52 between the securing claw 50 (FIG. 5). Furthermore, a projection in the form of a filling strip 60 is disposed on the upper half 42 of the coupling, element 38 and its cross section is embodied so that it extends the cross section of the wind deflecting strip 34 and consequently fills the recess 36 with regard tot he wind deflecting strip 34 (FIG. 2).

It is clear from FIGS. 1, 3, and 4 that in the vicinity of the pivot bolt 16, the wiper arm 12 has two walls 62 spaced apart from and parallel to each other, which are aligned protruding toward the window 24, each of which secures an end of the pivot bolt 16. The distance between the walls 62 is matched to the width of the coupling element 38 so that a guidance of the wiper blade wiping walls 62 is produced, which has the least amount of play possible. On the other hand, the matching should be carried out so that a relative movement between the wiper arm 12 and the wiper blade 10 around the pivot axis 64 (FIG. 4) of the connecting device 14 is not prevented. It is also clear from FIGS. 2, 3, and 5 that between the two halves 40 and 42 of the coupling element 38, a dividing plane 66 is produced which extends essentially parallel to the window surface to be wiped. With an offset 68, the dividing plane 66 intersects the pivot bolt bearing 48 approximately diametrically opposite from the film hinge 44 which produces the two bearing hub halves 55 and 56. With the exception of the film hinge connection between the two halves 40 and 42 that is insignificant with regard to the strength of the coupling element 38, the two halves can be thought of as individual parts of the coupling element 38 which are detachably connected to each other with the aid of the edge strips 30 and the detent hooks 58 that engage these edge strips. Calling the two halves the upper half and the lower half is understood to refer to the position of the dividing plane 66 in relation to the window 20 and the disposition of the two halves 40 and 42 of the coupling element 38 in relation to each other.

The production of the pivotal connection between the wiper blade 10 and the wiper arm 12 will be explained below in conjunction with FIGS. 2 and 5. For the sake of visibility as a component on the wiper blade side, only the one spring strip 28 and the lower half 40 of the coupling element 38 secured to it have been shown in FIG. 5. For the same reason, the wiper arm with its pivot bolt 16 is depicted with dot-and-dash lines. In a first assembly step, the free end of the wiper arm 12 is guided over the upper half 42 of the open coupling element 38 so that the pivot bolt 16 comes to rest in the one bearing hub half 55 of the lower half 40 (FIG. 5). Then, the wiper arm, together with the upper half 42 of the coupling element, is pivoted in the direction of the arrow 70 until the operating position of the wiper arm and coupling element 38 shown in FIG. 2 has been achieved, in which the two bearing hub halves 55, 56 are assembled so that the closed pivot bolt bearing 48 is produced. In doing so, however, care must be taken that before this operating position is reached, the wiper blade 10 is pivoted up in the direction of the arrow 72 (FIG. 2) in relation to the wiper arm so that the detent hooks 58 are not overlapped on their outsides by the walls 62 of the wiper arm 12. Because only then can the detent hooks 58 of the upper half 42 of the coupling element 38, which is made of an elastic plastic, deflect laterally—arrows 74 in FIG. 3, traverse the longitudinal outer edges of the edge strips 30, and cooperate in detent fashion with the lower band surface of the support element oriented toward the window or with the two edge strips 30 of the spring strips 28. If the wiper blade 10 is then placed with its wiper lip 22 against the window 24, the detent hooks 50 are inserted between the walls 62 of the wiper arm 12 (FIG. 3) and are thus non-detachably secured in their detent position during wiper operation. This also applies to the securing of the wiper blade 10 to the pivot bolt 16 guided in the pivot bolt bearing 48.

A detachment of the wiper blade 10 from the wiper arm 12 occurs in the opposite sequence as the assembly steps explained above. First, the wiper blade, together with the wiper arm, is lifted up from the window. Then, the wiper blade is pivoted in relation to the wiper arm in the direction of the arrow 72 so that the detent hooks can emerge from the walls 62 of the wiper arm and can be deflected. Then, the upper half 42 of the coupling element 38 can be brought into its opening position shown in FIG. 5, wherein the film hinge 44 executes the necessary folding motion. Since the film hinge 44 has no influence on the stability of the coupling element 38 and its fastening to the support element 28, but primarily contributes to simplifying the assembly, despite the one-piece connection of the two halves 40 and 42 by means of the film hinge 44, this can be referred to as a detachable connection between these parts. Consequently, the pivot bolt 16 can be easily withdrawn from its bearing bore 48 when the wiper blade is detached from the wiper arm.

What is claimed is:

1. A device comprising a wiper blade (10) for motor vehicle windows (24) that is pivotally connected to a wiper arm (12) that is guided on a motor vehicle and can be moved back and forth between reversing positions, which wiper arm (12), on its free end section, is provided with a pivot bolt (16) extending essentially in the movement direction (double arrow 18) for connecting the wiper blade, which can be placed with an elongated, rubber elastic wiper strip (20) against the window (24), and the elongated wiper blade (10) has a pivot bolt bearing (48) and means for securing the wiper blade to the pivot bolt (16) guided in the bearing so that the pivot bolt (16) of the wiper arm (12) is supported in the pivot bolt bearing (48) of the wiper blade (10), wherein the wiper strip (20) of the wiper blade (10) is secured to a spring elastic, band-like, elongated support element (28) which, on its two longitudinal sides, at least in sections, protrudes beyond the longitudinal sides of the wiper strip (20) with edge strips 30, that a coupling element (38) with the pivot bolt bearing (48) is disposed on the upper band surface of the support element (28) remote from the window and the coupling element is connected to the edge strips (30) of the support element via securing means (50).

2. The device according to claim 1, wherein the support element includes two support strips (28), which are disposed in longitudinal grooves (26) of the wiper strip (20) and, at least over a longitudinal section, protrude from their longitudinal grooves with edge strips (30) which are engaged by the securing means (50) of the coupling element (38).

3. The device according to claim 1, wherein the coupling element (38) is divided in a plane disposed at least approximately parallel to the window (24), that the plane (66, 68) intersects the pivot bolt bearing (48), and that the two coupling element halves (40, 42) are detachably connected to each other.

4. The device according to claim 3, wherein the pivot bolt bearing (48), in the longitudinal direction of the wiper blade, is disposed at an end section of the coupling element (38) and that the two coupling element halves (40 and 42) are of one piece with one another and are connected to one another by means of a film hinge (44) in the vicinity of the pivot bolt bearing (48).

5. The device according to claim 3, wherein with regard to the position of the dividing plane (66) in relation to the window (20), the lower half (40) of the coupling element (38) encompasses the longitudinal outer edges of the edge strips (30) of the support element (28) with securing claws (50) that constitute the securing means.

6. The device according to claim 5, wherein each edge strip (30) of the support element (28) is engaged by two securing claws (50) of the lower half (40) which are disposed spaced apart from each other by a distance 52.

7. The device according to claim 6, wherein with regard to the position of the dividing plane (66) in relation to the window (24), the upper half (42) of the coupling element (38) is provided with elastically deflectable detent hooks (58) which traverse the longitudinal outer edges of the edge strips (30) and cooperate in detent fashion with a lower band surface of the support element (28).

8. The device according to one of claim 7, wherein the detent hooks (58) of the upper half (42) of the coupling element (38) are disposed between the securing claws (50) of the lower half (40).

9. The device according to claim 1, wherein at least in the vicinity of the pivot bolt (16), the wiper arm (12) has two walls (62) spaced apart from and parallel to each other, which are aligned protruding toward the window (24), each of which secures an end of the pivot bolt (16) and that the distance between the walls is matched to the width of the coupling element (38).

10. The device according to claim 1 for a wiper blade, with a wind deflecting strip (34) that extends beyond the upper band surface of the support element (28), wherein the coupling element (38) is disposed in a recess (36) in the wind deflecting strip (34) and that the upper half (42) of the coupling element (38) is provided with an extension (60) whose cross section at least approximates the cross section of the wind deflecting strip (34).

11. The device according to claim 1, wherein the coupling element (38) is made of an elastic plastic.

* * * * *